Patented Jan. 30, 1934

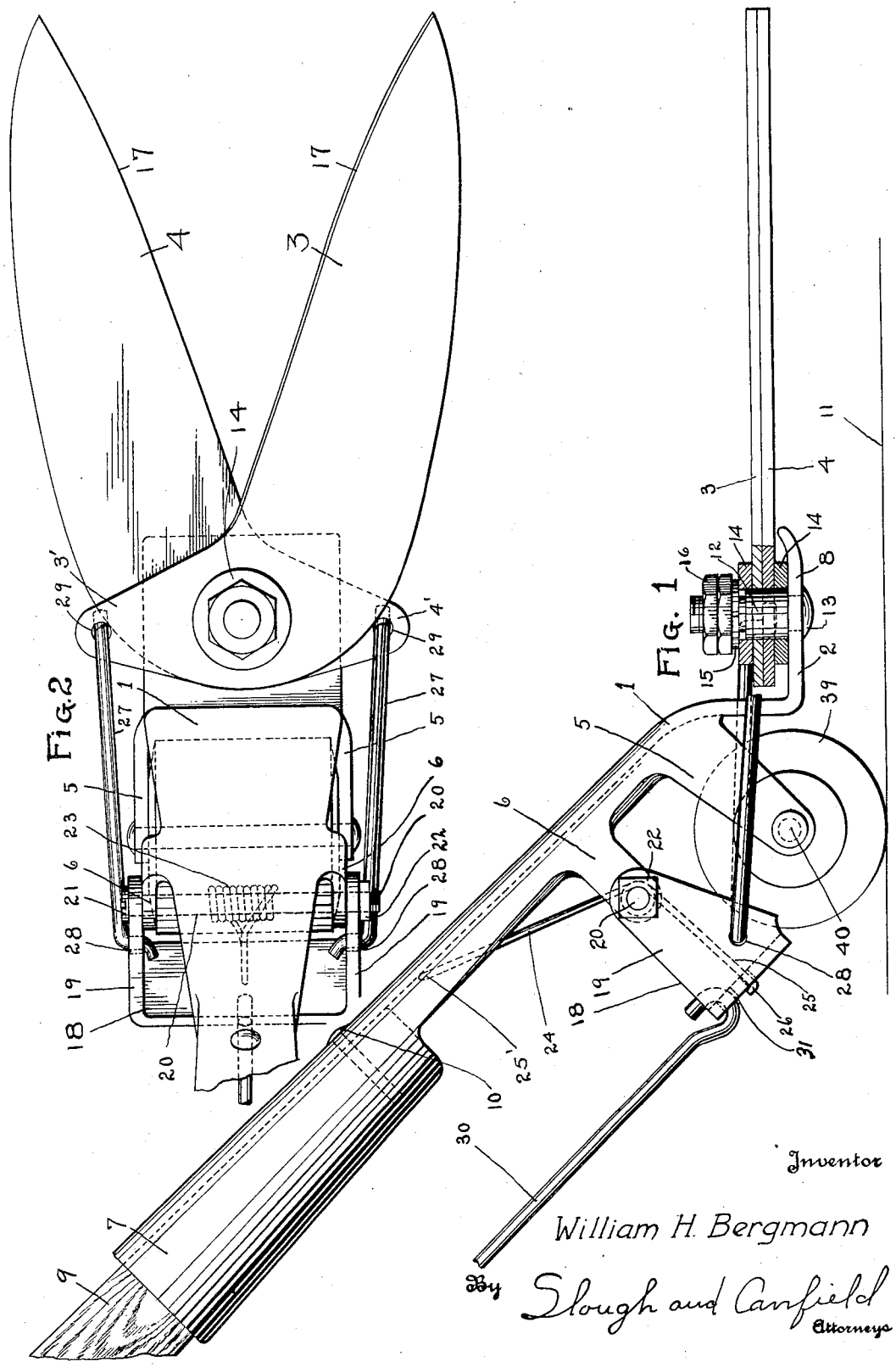

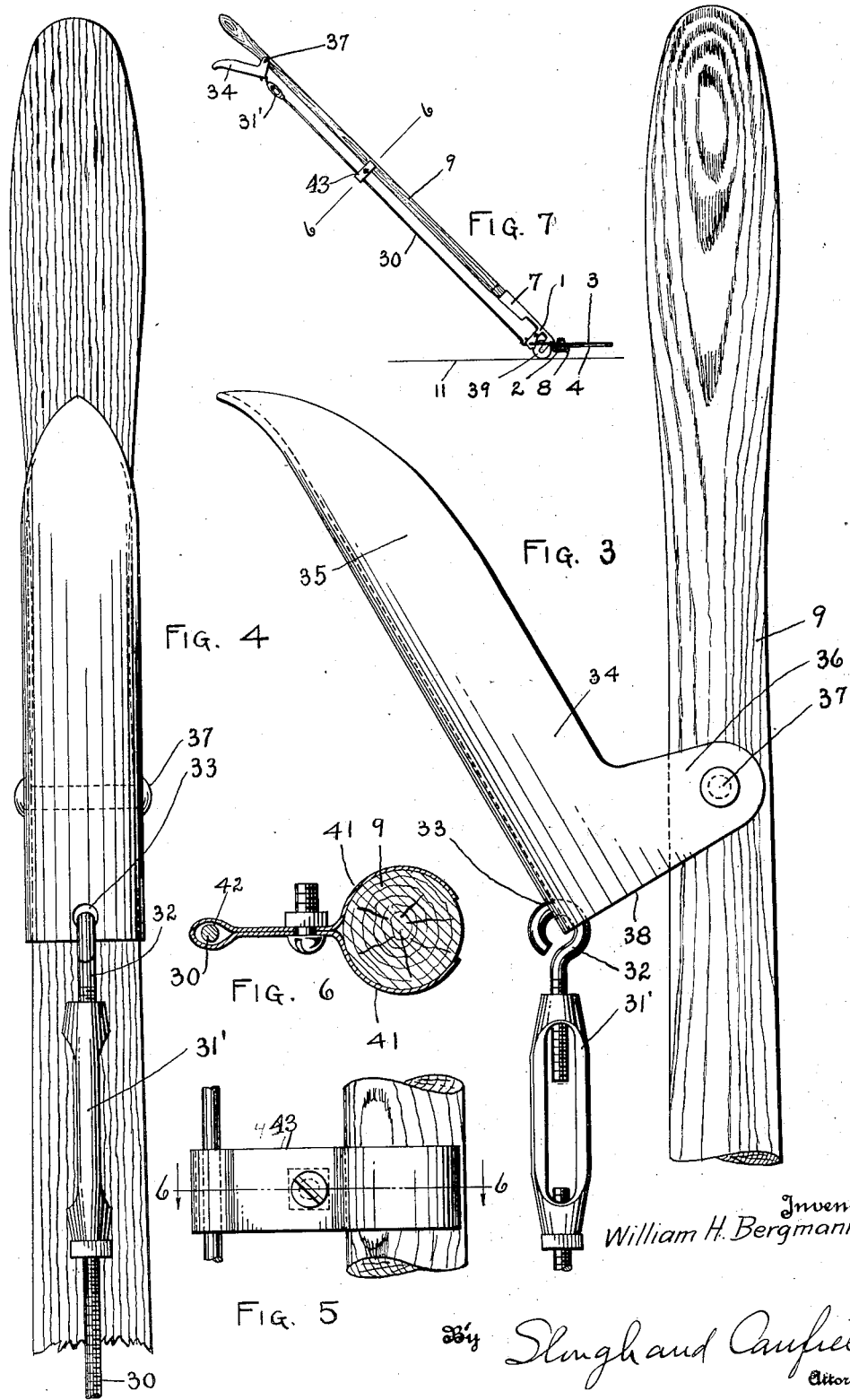

1,944,917

UNITED STATES PATENT OFFICE 1,944,917

SHEARS

William H. Bergmann, Cleveland, Ohio, assignor to The American Fork & Hoe Company, Cleveland, Ohio, a corporation of Ohio Application November 21, 1930
Serial No. 497,300

14 Claims. (Cl. 56—241)

My invention relates to shears, and relates particularly to grass shears.

My present invention involves the provision of a grass trimming pair of shears adapted to be operated while disposed in an approximately horizontal plane while the operator is standing erect and propelling the shears forward. Shears of this type are adaptable for many purposes, such as for trimming the grass growing immediately adjacent the edges of drives, walks, or close to the foundations of buildings.

The tool of my invention is operable in a most advantageous manner, when equipped with a relatively long handle although in its broader phases my invention is not limited to the use thereof.

An object of my invention is to provide an improved grass cutting shears.

Another object of my invention is to provide an improved type of grass cutting shears readily susceptible of use by an operator while standing in an erect position.

Another object of my invention is to provide a more durable tool of the general type to which my invention appertains.

Another object of my invention is to provide a durable tool of improved construction for cutting grass or the like which will be inexpensive to manufacture and to maintain in highly efficient operating condition.

Other objects of my invention and the invention itself will be readily apparent from the following description of an embodiment of my invention, in which reference is had to the accompanying drawings illustrating the said embodiment.

In the drawings:

Fig. 1 is a side elevational view, broken away to show the shear blades and associated parts in section adjacent the pin by which the blades are pivotally secured to the frame, and with the handle and operating rod for the blades broken away, because of lack of space on the sheets of drawings to show them in one view;

Fig. 2 is a plan view of most of all of the parts shown in Fig. 1, but with the handle and handle support, and shear operating rod broken away because of lack of space to completely illustrate them;

Fiig. 3 is a side elevational view of the hand grip end of the handle and the shear operating means disposed thereat;

Fig. 4 is a side elevational view of the part shown in Fig. 3, the view however being taken at right angles to that of Fig. 3;

Fig. 5 is an enlarged view of a part of Fig. 7;

Fig. 6 is a transverse sectional view taken from the plane 6—6 of Fig. 7, drawn to a larger scale;

Fig. 7 is a side elevational view, much reduced of the complete tool, from which the parts shown in the other figures may be corelatively understood. In this figure the line 6—6 indicates the line of section on which Fig. 6 was taken, this line of section being also shown in Fig. 5.

Referring now to all of the figures of drawings, on all of which like parts are designated by like reference characters, at 1, I show a sheet metal tool supporting frame provided with a tip flange extension 2 for supporting shear blades 3 and 4, and laterally dependent pairs of arms 5, 5 and 6, 6, with a rearwardly extending handle receiving socket 7, integrally formed therewith.

The frame 1 is of channel form intermediate the socket 7 and the tip extension 2, and the socket 7 is formed by bending the pair of wings extending laterally from the rearmost portion of the frame, inwardly to bring their edges together, the wings being pre-formed so that the resultant tube is tapered outwardly.

The shear-blade supporting tip is approximately of L-form, with the supporting arm joined to the channelled frame, extending at an approximately obtuse angle therefrom.

By virtue of this disposition of the tip 2 its arm 8 supporting the shear blades will take an approximately horizontal position when the long handle 9, which is secured by the bolt 10 in the stale socket 7, is disposed at a convenient angle to the surface of the ground 11, such as an angle of forty-five degrees thereto, approximately as shown.

A pin 12 projects upwardly from the horizontal portion 8 of the frame tip being riveted thereto by its head 13. The shear blades 3 and 4 of the suitable form shown are perforated at the junction of their laterally extending lever arms 3' and 4', and their blade portions, and the pin 12 is projected through the perforations, and through perforations of washers 14, and a lock washer 15.

Nuts 16 screw-threaded onto the end of the pin 12 securely clamp the blades 3 and 4 between the washers 14, sufficiently to hold them in close relative shearing positions so that their sharp edges 17 will be firmly engaged when the blades are oscillated convergingly on the pin 12, but permitting ready oscillation of the blades on the pin.

Pendantly supported from the arms 6 of the channelled frame 1, a U-shaped lever 18 is provided having its parallel arms 19 apertured near their ends to receive a bolt 20 projected laterally therethrough and through aligned apertures through the lower ends of each of the arms 6, said bolt being provided with a head 21 at one end and a nut 22 at the other end.

A helical spring 23 is telescoped over the bolt 20 and is provided with a pair of wire ends 24 and 25 extending divergingly from the ends of the helix, the end 24 bearing against the inner surface of the channelled frame 1 at 25' and the other wire end 25 projecting through an aperture of the intermediate yoke portion of the U-shaped lever 18 and terminates in a sharply bent tip portion 26.

In the position of the parts shown, the helix with its terminal arms 24 and 25 is constrained to a relatively tightly wound condition of the helix and reacting tends to force the lever 18 in a counter-clockwise direction, as viewed in Fig. 1.

A pair of thrust rods 27 disposed at the two sides of the frame 1 and laterally of the pendant arms 5 interlocks the lever 18 to the lever arms 3' and 4' of the crossed blades 3 and 4 respectively. These rods each project through an aperture 28 of an arm 19 of the U-shaped lever 18, near its yoke and extend forwardly therefrom each to an aperture 29 of a different one of the shear blade lever arms 3' or 4'. The ends of the rods 27 are bent, suitably to readily effect retaining engagement with the lever 18 and the blade lever arms respectively in apertures of which the ends of the rods are loosely retained.

By virtue of this arrangement, swinging movements of the U-shaped lever 18 communicate through the rods 27 shearing movements to the blades 3 and 4 simultaneously. A pole rod 30 hooked through an aperture 31 disposed centrally through the yoke portion of the U-shaped lever 18 near its rear edge extends along the handle 9 to connect by an adjusting turnbuckle 31', Figs. 3, 4 and 7, to a hook 32 screw-threaded in an end of the turnbuckle and hooked through an aperture 33 of a compression grip member 34.

The member 34 is of generally rounded channel form and comprises a hand-grip arm 35 and a pair of laterally extending parallel wings 36 which are journalled on a pin 37 extending through aligned apertures of said wings and through the handle 9, relatively near its free end. The aperture 33 through which the hook 32 is projected is disposed near the junction of the outer edges 38 of the arm 36 and the convex surface of the hand-grip arm 35. The operator first adjusting the turnbuckle 31 to properly adjust the blades 3 and 4, in open position approximately as shown grasps the handle 9 and the hand-grip 35 of the lever member 34 and presses the arm 35 towards the handle.

A pull on the rod 30 is thereby effected, and communicated to the lever arms 3' and 4' of the shear blades by the interconnecting swinging lever 18 and connecting rods 27, against the power of the helical spring 23 which is by this movement of the parts constrained toward still more tightly coiled form.

A roller 39 journalled upon an axle 40 projected through and secured to the lower ends of the frame arms 5 supports the shear supporting frame tip 8 in proper spaced relation to the surface 11 of the ground, and as the shears are operated from the hand-grip member 34, in the manner described, the wheel 39 will readily permit the shears to be advanced when the handle 9 is pushed. Secured by arms 41 of a bracket 43, a sheet metal loop 42 is carried on the handle 9 intermediate its ends and loosely receives an intermediate portion of the pull-wire 30 to support it in proper spaced relation to the handle 9.

The apparatus described may be employed in a number of different ways to perform the function of a long handled shear, but when employed for trimming grass or the like, it is susceptible to being pushed along the ground supported solely by the roller 39 while the blades 3 and 4 are rapidly and periodically oscillated to bring their shearing edges 17 into intermittent shearing engagement.

Having thus described my invention in a specific embodiment, I am aware that numerous and extensive departures may be made from the embodiment herein illustrated and described but without departing from the spirit of my invention.

I claim:

1. In a grass shear, a pair of co-operative bell crank shear blades comprising longitudinally extending shear portions and arms extending laterally therefrom, a horizontal sheet metal support therefor, said blades hinged on said support for lateral horizontal oscillatory movement of the shear portion effected by the transmission of longitudinal reciprocatory movement to the said arms, a long handle secured by an end of said support and reciprocable means extending longitudinally of said handle for reciprocating the arms and means on the other end of the handle for reciprocating the reciprocable means.

2. In a grass shear, a pair of co-operative shear blades, a horizontal sheet metal support therefor, said blades hinged on said support for lateral horizontal oscillatory movement, a long handle secured by an end to said support and reciprocable means extending longituidnally of said handle, each of said blades having an operating tongue extending beyond its hinged portion and laterally thereof, a substantially U-shaped element hinged by its arms on said suport, and means interconnecting an intermediate portion of said U-shaped element and each tongue, said reciprocable means connected to said U-shaped element to rotatably swing it.

3. In a grass shear, a pair of bell crank shear blades comprising longitudinally extending shear portions and arms extending laterally therefrom, a support having relatively angularly extending handle and blade carrying portions, a hinge pin extending from said blade carrying portion, said blades hinged on said pin, a long handle secured to said handle carrying portion, and means extending longitudinally of said handle and operable from the free end thereof to effect forward and rearward reciprocatory movement of the arms to oppositely oscillate said blade shearing portions rotatably on said pin.

4. In a grass shear, a pair of bell crank shear blades comprising longitudinally extending shear portions and arms extending laterally therefrom, a support having relatively angularly extending handle and blade carrying portions, a hinge pin extending from said blade carrying portion, said blades hinged on said pin, a long handle secured to said handle carrying portion, means extending longitudinally of said handle and operable from the free end thereof to effect longitudinal reciprocatory movement of the blade arms in one direction to co-incidentally and oppositely oscillate said shear blades rotatably on said pin, and a spring for oppositely retracting the arms to oscillate said blades to one of two operative positions.

5. In a grass shear, a pair of shear blades, a support having angularly extending handle and blade carrying portions, a hinge pin extending from said blade carrying portion, said blades hinged on said pin, a long handle secured to said handle carrying portion, an interconnecting element hinged onto an intermediate portion of said support and rotatably oscillatable on a hinging axis disposed at substantially right angles to the hinging axis of said blades, manually operable means at the free end of said handle and hingedly connected thereto for oscillating said blades, and means to communicate oscillatory movement from said manually operable means to said blades said means including said interconnecting element and separate longitudinally oscillatable means extending therefrom in opposite directions, respectively to said manually operable means and to said shear blades.

6. In a grass shear, a pair of co-operative bell crank shear blades, a horizontal sheet metal support therefor having unitary downwardly extending side arm elements, said blades hinged on said support for lateral horizontal oscillatory movement, a bell crank member depending from said arms, and a long handle secured by an end to said support, and reciprocable means extending longitudinally of said handle and cooperating with said bell crank means for operating said blades from the other end of the handle.

7. In a grass shear, a pair of co-operative bell crank shear blades, having a single pivotal center, a bell crank element, means communicating movement from the bell crank element to the bell crank shear blades for simultaneously operating both of said blades.

8. In a shear, a pair of cooperative pivoted bell crank shaped shear blades adapted to be disposed substantially parallel to the ground and having cutting edges on one arm of each bell crank and the other arm projecting laterally therefrom, an upwardly rearwardly inclined handle, and forwardly and rearwardly reciprocable means pivotally connected to the other arms of said shear blades and movable with said arms, handle supported manually operable means for reciprocating the reciprocable means.

9. A shear as described in claim 8 and in which manually operable means are adapted to move said means to oscillate said blades.

10. A shear as described in claim 8 and in which the blades are moved in one shearing direction by the operable means and a spring is associated with the operable means adapted to retract the blades in the other direction upon the release of the manuable means.

11. A shear as described in claim 8 and in which both of said bell crank shear blades are pivoted to oscillate upon a common axis.

12. In a pair of pivoted shear, each a bell crank shaped shear blade having a cutting edge on one arm of the said blade and an arm extending laterally therefrom and means connected to the laterally extending arm having a portion bodily reciprocable forwardly and rearwardly therewith and means for reciprocating the said means.

13. In a shear, a frame including a handle, a bell crank shaped shear blade comprising a shearing arm and a laterally extending arm pivoted on the frame, an oscillatory element pivoted to the frame, and pivotally connected to the laterally extending arm of the blade, operable means on the handle for oscillating the oscillatable element to oscillate the blade.

14. In a shear, a frame including a handle, a pair of bell crank shaped shear blades pivoted on the frame, each comprising a shearing arm and an arm extending laterally therefrom, a forwardly and rearwardly oscillatable element pivoted to the frame and pivotally connected to the laterally extending arms of the blades, and operable means on the handle for oscillating the oscillatable element to oscillate the blades.

WILLIAM H. BERGMANN.